Patented Aug. 10, 1948

2,446,581

UNITED STATES PATENT OFFICE 2,446,581

ADHESIVE COMPOSITION COMPRISING A POLYALKYLENE GLYCOL AND AN ALKYD RESIN

Leon J. Gold, Shorewood, and Samuel Zweig, Milwaukee, Wis., assignors to Milprint, Inc., Milwaukee, Wis., a corporation of Delaware No Drawing. Application March 2, 1946, Serial No. 651,617

4 Claims. (Cl. 260—16)

The invention relates to thermoplastic coating compositions.

Heretofore labels have been bonded to glass, fibre or metal containers by fluid or pasty glues. This method of labeling has been found to be very troublesome, frequently causes machine "breakdown" and slows up production. The object of this invention is to provide a thermoplastic coating composition which when applied to a sheet of one or more labels will produce a label that is readily bonded to glass, metal or fibre containers by heating the label to cause the coating to become tacky, so that it will readily adhere to the container or other object to be labeled with slight pressure. Labels having the composition embodying the invention are non-tacky at ordinary temperatures and only become tacky on heating and may consequently be used in so-called labeling machines without danger of machine "breakdown" or slowing up of production.

The invention further consists in the thermoplastic coating composition hereinafter described and more particularly defined by claims at the conclusion.

The thermoplastic coating composition of this invention has as its base a compound of the group of polyalkylene glycols containing two to three carbon atoms in each alkylene unit such as polyethylene glycol, polypropylene glycol and polyisopropylene glycol and their derivatives such as the phthalate condensation product of polyethylene glycol or polyethylene glycol mono-stearate or polyethylene glycol di-stearate.

Polyethylene glycols, also known as polyoxyethylene glycols comprises a series of polymers having the general formula:

The polymers of average molecular weight above 1000 are wax-like solids having melting points beginning with 35° C. for the 1000 molecular weight to 70° C. for the 7000 molecular weight. They are freely soluble in water but only slightly soluble in organic solvents such as ethyl alcohol, toluol or acetone. They do, however, dissolve in concentrations as high as fifty per cent in these organic solvents when heated to 50° C.

Polyalkylene glycols of the type above described having an average molecular weight of 2000 or over and preferably between 3500 and 5000 are preferred for this invention. These are wax-like solids which alone do not adhere well to paper, form brittle films, and cannot be used without modification as a heat-sealing coating. However, we have found by the addition of resinous substances such as the condensation products of poly basic acids and polyhydric alcohols known as "alkyd" resins, modified "alkyd" resins, etc., a flexible coating composition is obtained which is dry and non-tacky at room temperature and which will bond by application of heat and pressure to glass metal or fibre containers.

As hereinafter noted in certain of the examples given, other resins such as coumarone-indene resin may be used in addition to the alkyd resins.

Coumarone-indene resins are derived from coal tar naphthas having a boiling range of 150–200° C., produced in the coking of coal in by-product coke ovens. The naphthas are purified and polymerization is effected by intimate admixture with concentrated sulfuric acid.

Alkyd resins are the product of condensation between polybasic acids such as maleic, phthalic and succinic acids and polyhydric alcohols such as glycerol, ethylene glycol and pentaerythritol. Maleic alkyd is produced by heating ethylene glycol with maleic acid until a solid resinous material is obtained. Modified alkyd resins are reaction products of polybasic acids and polyhydric alcohols with rosin, fatty acids derived from oil, urea and other substances, the modifying additions being incorporated in the reaction mixture during the process of condensation thereby becoming a part of the complex molecule. For example, terpene maleic ester of ethylene glycol is produced by reacting ethylene glycol with a polybasic acid obtained as the reaction product of terpinene and maleic anhydride.

As previously noted, derivatives of polyalkylene glycols may be used as a base, for example derivatives of polyethylene glycol where either one or both terminal hydroxy groups are reacted with other substances such as fatty acids or polybasic acids, examples of which are the phthalate condensation product of polyethylene glycol, polyethylene glycol mono-stearate and polyethylene glycol di-stearate. These compounds when modified with the resins described above also yield flexible coating compositions suitable for the purposes of this invention. Homologous polyglycols such as polypropylene glycol and polyisopropylene glycol and the derivatives thereof of the type described above under polyethylene glycol have been found equally desirable for the practicing of this invention.

The proportion of ingredients used for this coating composition are from 40% to 90% by weight of the polyalkylene glycol compound or its derivative and 10% to 60% by weight of one or more of the resinous modifiers of the type previously mentioned.

Other film forming substances such as polyvinyl acetate, cellulose nitrate or ethyl cellulose may be added in some instances in smaller proportions from 1% to 25% by weight to modify the properties of the coating composition such as increasing the strength of the bond or raising the temperature at which the coating becomes tacky.

The following specific formulae are given as examples.

Example 1

| | Parts by weight |
|---|---|
| Polyethylene glycol (molecular weight 5000) | 60 |
| Maleic alkyd | 40 |

Example 2

| | |
|---|---|
| Polyethylene glycol (mol. wt., 5000) | 67 |
| Terpene maleic ester of ethylene glycol | 33 |

Example 3

| | |
|---|---|
| Polyethylene glycol (mol. wt., 5000) | 38 |
| Terpene maleic ester of ethylene glycol | 6 |
| Polyvinyl acetate | 6 |
| Ethanol (ethyl alcohol) | 50 |

Example 4

| | |
|---|---|
| Polyethylene glycol (mol. wt., 3500) | 60 |
| Coumarone-indene resin (135° C. melting point) | 10 |
| Terpene maleic ester of ethylene glycol | 30 |

Example 5

| | |
|---|---|
| Polyethylene glycol monostearate | 60 |
| Terpene maleic ester of ethylene glycol | 30 |
| Coumarone-indene resin (135° C. melting point) | 10 |

The polyethylene glycol monostearate is obtained by heating one molecule of polyethylene glycol of a molecular weight of 5000 with one molecule of stearic acid.

Example 6

| | Parts by weight |
|---|---|
| Polyisopropylene glycol (mol. wt., 4000) | 60 |
| Maleic alkyd | 40 |

The above coating compositions may be applied to the sheet material, such as labels, in a suitable coating machine in a heated molten state about 200° F., or said compositions may be dissolved in a volatile solvent such as toluol or ethanol at 130° F. and applied to the material to be coated at that temperature. On cooling the coating becomes dry and non-tacky, and for bonding the coated labels or other coated material to containers of glass, metal, or fibre it is only necessary to apply heat and pressure at the time of application to effect the efficient bonding of the coated material to the container.

The specific compositions described in this specification are given as exemplificatory embodiments of the invention, and it is intended to include in the appended claims not only such specific compositions and their range of proportions but also any equivalents and variations within the scope of this disclosure.

What we claim as our invention is:

1. A thermoplastic composition comprising sixty to seventy parts by weight of a substance containing within its molecule polyalkylene groups, each having from two to three carbon atoms, said substance being selected from the group consisting of polyethylene glycol, polypropylene glycol, polyisopropylene glycol and their ester derivatives with an average molecular weight of at least 2000, and ten to forty parts by weight of a resinous modifier consisting of maleic alkyd.

2. A heat activated adhesive composition comprising a predominant proportion, not less than sixty per cent by weight, of a substance containing within its molecule polyalkylene groups, each having from two to three carbon atoms, said substance being selected from the group consisting of polyethylene glycol, polypropylene glycol, polyisopropylene glycol, and their ester derivatives with an average molecular weight of at least 2000 as a heat responsive ingredient of the composition, and a minor proportion in effective amount, not in excess of forty per cent by weight, of an alkyd resin as a cohesion increasing and brittleness suppressing ingredient for the heat responsive ingredient.

3. A heat activated adhesive composition comprising a predominant proportion, not less than sixty per cent by weight, of a substance containing within its molecule polyalkylene groups, each having from two to three carbon atoms, said substance being selected from the group consisting of polyethylene glycol, polypropylene glycol, polyisopropylene glycol, and their ester derivatives with an average molecular weight of at least 2000 as a heat responsive ingredient of the composition, and a minor proportion in effective amount, not in excess of forty per cent by weight, of resinous modifiers consisting of a mixture of alkyd resins and coumarone-indene resin in the ratio by weight of about three to one.

4. A composition as set forth in claim 2 to which is added a film forming substance, not in excess of twenty-five per cent by weight of the group consisting of polyvinyl acetate, cellulose nitrate, and ethyl cellulose dissolved in a suitable solvent.

LEON J. GOLD.
SAMUEL ZWEIG.

REFERENCES CITED

The following references are of record in the file of this patent:

FOREIGN PATENTS

| Number | Country | Date |
|---|---|---|
| 705,852 | France | June 16, 1931 |

OTHER REFERENCES

Synthetic Organic Chemicals—Carbide and Carbon Chemicals Corp., July 1, 1945; pages 20 and 21.